3,703,389
OPTICAL GLASS HAVING A HIGH REFRACTING INDEX AND A HIGH COLOR DISPERSION

Heinz Brömer, Hermannstein, and Norbert Meinert, Wetzlar, Germany, assignors to Ernst Lietz GmbH, Wetzlar, Germany
No Drawing. Filed Aug. 3, 1970, Ser. No. 60,630
Claims priority, application Germany, Aug. 14, 1969, P 19 41 374.2
Int. Cl. C03c *3/10, 3/30, 3/02*
U.S. Cl. 106—47 Q      4 Claims

ABSTRACT OF THE DISCLOSURE

An optical glass of which the refractive index ranges between $n_e = 1.77$ and $n_e = 1.83$, and of which the Abbé number ranges between $V_e = 26$ and $V_e = 23$. The glass consists essentially of a glass former of silicon dioxide and germanium dioxide in addition thereto a relatively high percentage of titanium dioxide is added. Other ingredients present are the oxides of sodium and potassium as well as the oxides of boron and lead. In spite of the high percentage of titanium dioxide the glass is only faintly colored.

BACKGROUND OF THE INVENTION

The present invention relates to an optical glass having a high refractive index and a high color dispersion. The invented glass may be compared to the known flint glasses but has a considerably higher dispersion than the known glasses.

In the U.S. patent application Ser. No. 836,677 filed Apr. 4, 1969 and assigned to the same assignee as the present invention, flint glasses are disclosed which consist of a high percentage of titanium dioxide. The glasses have generally a higher color dispersion than the prior art flint and heavy flint glasses. It is a particular advantage of the glasses to have a considerably lower density than the known glasses, which fact becomes important especially with voluminous objectives.

The glasses disclosed in the above specified application consist essentially of 27 to 37% by weight of $SiO_2$ and $B_2O_3$ with the mol ratio of $SiO_2$ to $B_2O_3$ ranging between 1.5 and 6, of 20 to 40% by weight of $TiO_2$ and of 30 to 50% by weight of the oxides of a group consisting of the elements of lithium, sodium, potassium, rubidium, and cesium with the mol ratio of $TiO_2$ to these alkali oxides ranging between 0.5 and 2. The quantity of $SiO_2 + B_2O_3$ in excess of 15% by weight of the total composition may be replaced by PbO and/or $Sb_2O_3$ and the quantity of alkali oxides in excess of 20% by weight of the total batch composition may be replaced up to 25% by weight by the oxides chosen from a group including magnesium, calcium, strontium, barium, zinc, cadmium, and zirconium. These glasses have a power of refraction of 1.75, at the utmost, and an Abbé number of about 27.

SUMMARY OF THE INVENTION

It has now been discovered that an even higher power of refraction may be achieved in glasses containing a high percentage of $TiO_2$ if $SiO_2$ and $GeO_2$ are used as the glass formers and the amount of those glass formers ranges from 28 to 40% by weight, with the percentage of $GeO_2$ alone being about 10 to 20% by weight. The glasses consist further essentially of 14 to 40% by weight of $TiO_2$
12 to 30% by weight of the oxides of Na and K
10 to 30% by weight of PbO and
Up to 5% by weight of $B_2O_3$ These glasses may also contain 0–10% by weight of $WO_3$ and 0–15% by weight of $Ta_2O_5$.

The glasses have a refractive index of up to about 1.83 and Abbé numbers of about 25. The high index is achieved by the reduction of the percentage of $SiO_2$ and the percentage of the alkali oxides.

Further, the glasses are only slightly colored in spite of the high percentage of $TiO_2$. This is probably due to the following circumstances. It is well known that $TiO_2$ in an acidic solution tends to form suboxides which cause heavy coloring. This coloring may be obviated, according to the disclosure in the above mentioned patent application, by adding a large quantity of alkali oxides. Substituting the only faintly acidic germanium dioxide for the considerably more acidic silicon dioxide however, allows a substantial reduction of the alkali oxides without running the risk of titanium dioxide forming suboxides. Like the glasses disclosed in the above mentioned patent application, the glasses according to the invention have also the advantage that they are substantially lighter in weight than the flint and heavy flint glasses presently available on the market.

DESCRIPTION OF THE PREFERRED EMBODIMENTS

In the following tables are given the composition data of several glasses according to the invention. Table 1 illustrates the partial substitution of $GeO_2$ for $SiO_2$ Table 2 discloses glasses wherein the percentage of alkali oxides is reduced compared to Table 1. In Table 3 are listed the batch compositions of glasses which include the oxides of tungsten and tantalum for variation of the optical characteristics.

TABLE 1

| | Melt No. | | | | | |
|---|---|---|---|---|---|---|
| | Prior art 1 | | 2 | | 3 | |
| | Percent by wt. | Mol percent | Percent by wt. | Mol percent | Percent by wt. | Mol percent |
| $SiO_2$ | 29.90 | 42.39 | 19.90 | 30.03 | 14.90 | 23.32 |
| $B_2O_3$ | 1.96 | 2.40 | 1.96 | 2.56 | 1.96 | 2.63 |
| $K_2O$ | 20.62 | 18.65 | 20.62 | 19.85 | 20.62 | 20.66 |
| PbO | 20.62 | 7.87 | 20.62 | 8.38 | 20.62 | 8.36 |
| $TiO_2$ | 26.90 | 28.68 | 26.90 | 30.53 | 26.90 | 31.59 |
| $GeO_2$ | | | 10.00 | 8.67 | 15.00 | 13.44 |
| $n_e$ | | | 1.7756 | | 1.7863 | |
| $v_e$ | | | 24.5 | | 25.5 | |
| $\Delta v_e$ | | | +10.5 | | +14.0 | |

TABLE 2

| | Melt No. | | | | | | | |
|---|---|---|---|---|---|---|---|---|
| | 4 | | 5 | | 6 | | 7 | |
| | Percent by wt. | Mol percent | Percent by wt. | Mol percent | Percent by wt. | Mol percent | Percent by wt. | Mol percent |
| $SiO_2$ | 19.90 | 30.17 | 19.90 | 28.04 | 18.90 | 26.63 | 17.90 | 25.26 |
| $B_2O_3$ | 1.96 | 2.57 | 1.96 | 2.37 | 1.96 | 2.37 | 1.96 | 2.39 |
| $K_2O$ | 15.62 | 15.10 | | | | | | |
| PbO | 20.62 | 8.42 | 20.62 | 7.81 | 20.62 | 7.82 | 20.62 | 7.84 |
| $TiO_2$ | 26.90 | 30.67 | 26.90 | 28.38 | 26.90 | 28.40 | 27.90 | 29.61 |
| $GeO_2$ | 15.00 | 13.06 | 15.00 | 12.12 | 15.00 | 12.13 | 15.00 | 12.16 |
| $Na_2O$ | | | 15.62 | 21.28 | 16.62 | 22.65 | 16.62 | 22.74 |
| $n_e$ | 1.8033 | | 1.8021 | | 1.8132 | | 1.8239 | |
| $v_e$ | 23.2 | | 24.0 | | 23.4 | | 23.0 | |
| $\Delta v_e$ | | | | | | | +13.8 | |

TABLE 3

| | Melt No. 8 | | Melt No. 9 | | Melt No. 10 | | Melt No. 11 | | Melt No. 12 | |
|---|---|---|---|---|---|---|---|---|---|---|
| | Percent by wt. | Mol percent | Percent by wt. | Mol percent | Percent by wt. | Mol percent | Percent by wt. | Mol percent | Percent by wt. | Mol percent |
| $SiO_2$ | 17.90 | 25.78 | 17.90 | 25.94 | 17.90 | 27.15 | 17.90 | 28.48 | 12.90 | 21.25 |
| $B_2O_3$ | 1.96 | 2.44 | 1.96 | 2.46 | 1.96 | 2.57 | 1.96 | 2.69 | 1.96 | 2.79 |
| $PbO$ | 20.62 | 7.99 | 20.62 | 8.05 | 20.62 | 8.42 | 20.62 | 8.83 | 20.62 | 9.14 |
| $TiO_2$ | 24.90 | 26.96 | 24.90 | 27.13 | 19.90 | 22.70 | 14.90 | 17.83 | 14.90 | 18.45 |
| $GeO_2$ | 15.00 | 12.41 | 15.00 | 12.49 | 15.00 | 13.07 | 15.00 | 13.71 | 20.00 | 18.92 |
| $Na_2O$ | 16.62 | 23.21 | 16.62 | 23.35 | 16.62 | 21.44 | 16.62 | 25.64 | 16.62 | 26.54 |
| $WO_3$ | 3.00 | 1.21 | | | | | | | | |
| $Ta_2O_5$ | | | 3.00 | 0.58 | 8.00 | 1.5 | 13.00 | 2.81 | 13.00 | 2.91 |
| $n_e$ | 1.8074 | | 1.8142 | | 1.7973 | | 1.7732 | | | |
| $v_e$ | 23.6 | | 23.6 | | 24.9 | | 26.1 | | | |
| $\Delta v_e$ | | | +11.2 | | | | | | | |

Example of glass production from a total of 1 kg. raw material

The various chemical components of a batch are thoroughly mixed and then placed in portions in a platinum crucible preheated to about 1150° C. The melt is homogenized by stirring at a temperature of about 1250° C. When the melt is completely free from bubbles the temperature is lowered to about 1100° C. and maintained for 15 minutes under continual stirring. Thereafter, the melt is cooled to 900° C. and then poured into a preheated steel mold.

What is claimed is:

1. An optical glass having an index of refraction $n_e$ of between about 1.77 and 1.83, and a high color dispersion value (an Abbé number $v_e$ between about 23 and 26) consisting essentially of:

28–40 percent by weight of a mixture of $SiO_2$ and $GeO_2$ wherein $GeO_2$ is about 10–20 percent by weight,
   14–40 percent by weight of $TiO_2$,
   12–30 percent by weight of the oxides of Na and K,
   10–30 percent by weight of PbO, and
   up to 5 percent by weight of $B_2O_3$.

2. The optical glass of claim 1 and further containing the oxides of tungsten and tantalum in the following quantities:

$WO_3$ 0–10 percent by weight
   $Ta_2O_5$ 0–15 percent by weight.

3. The optical glass of claim 1, wherein $B_2O_3$ is 1.96 percent by weight.

4. The optical glass of claim 2, wherein $WO_3$ is about 3 percent by weight.

References Cited

UNITED STATES PATENTS

| 3,529,980 | 9/1970 | Bromer et al. | 106—47 Q |
| 1,607,817 | 11/1926 | Dennis | 106—53 |
| 3,486,915 | 12/1969 | Bromer et al. | 106—47 Q |

FOREIGN PATENTS

| 1,037,932 | 8/1966 | Great Britain | 106—53 |

JAMES E. POER, Primary Examiner

M. L. BELL, Assistant Examiner

U.S. Cl. X.R.

106—53